Oct. 23, 1923.  1,471,363
H. H. SCHIELER
AUTOMOBILE
Filed Aug. 25, 1921   3 Sheets-Sheet 1

Inventor
Harry H. Schieler
By Cushman, Bryant Darby
Attorney

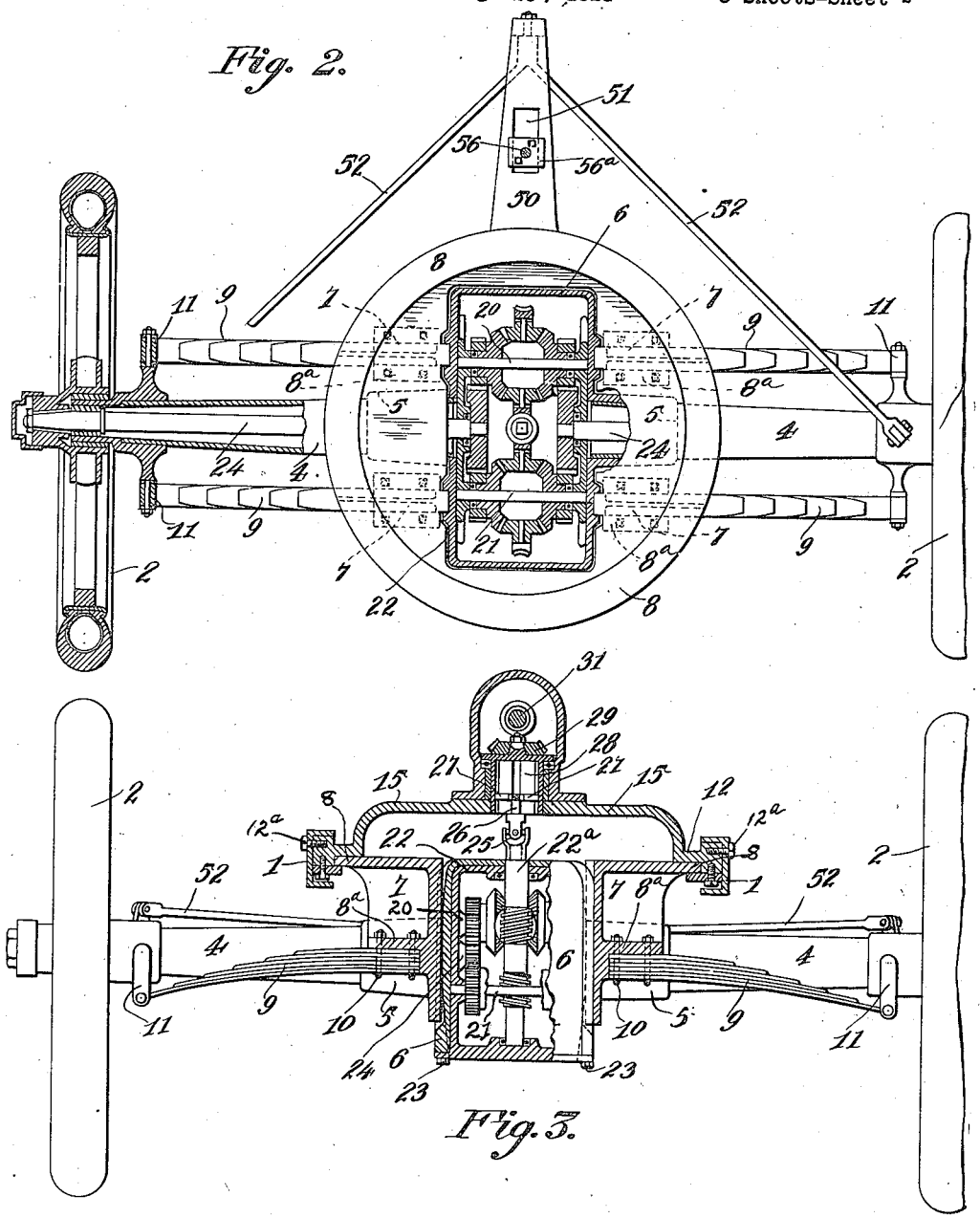

Oct. 23, 1923.
H. H. SCHIELER
AUTOMOBILE
Filed Aug. 25, 1921
1,471,363
3 Sheets-Sheet 3
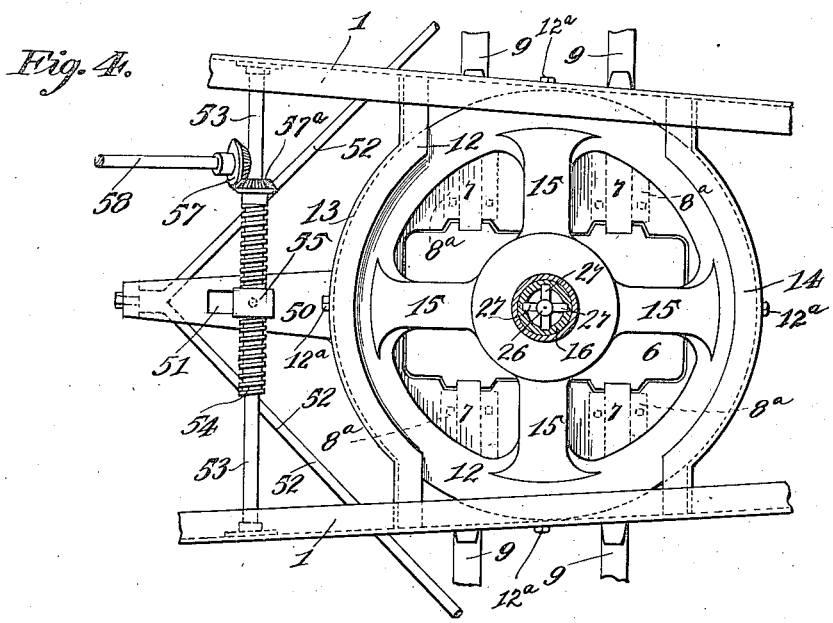
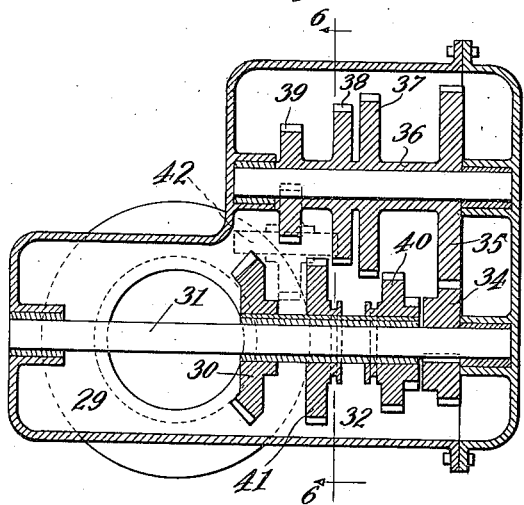
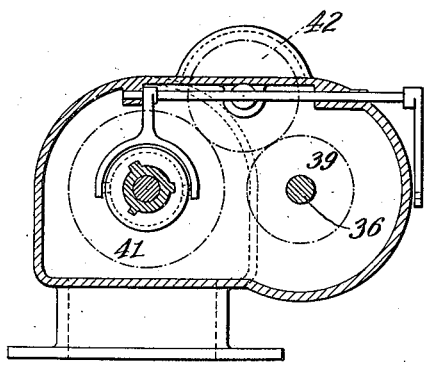
Inventor
Harry H. Schieler
By Cushman, Bryant & Darley
Attorney Patented Oct. 23, 1923.

1,471,363

UNITED STATES PATENT OFFICE.

HARRY H. SCHIELER, OF MEADOWS, IDAHO.

AUTOMOBILE.

Application filed August 25, 1921. Serial No. 495,227.

*To all whom it may concern:*

Be it known that I, HARRY H. SCHIELER, a citizen of the United States, residing at Meadows, in the county of Adams and State of Idaho, have invented new and useful Improvements in Automobiles, of which the following is a specification.

The present invention relates to improvements in automobiles, particularly of that type or class in which the front or steering wheels are also adapted to act as driving or propelling wheels.

Among the objects of the invention are to provide means whereby the parts of the driving mechanism may be compactly arranged and in such manner that the weight thereof is disposed relatively close to the front axle.

A further object is to provide a construction by which, if desired, the gearing of the driving mechanism may be readily removed bodily from the frame for the purpose of repair or replacement.

Other objects are to provide an arrangement by which the driving mechanism may be arranged relatively close to the motor or main power shaft, and in which the front driving and steering axle will be permitted to have a relatively free longitudinal rocking motion, regardless of the position of the rear wheels or the rigidity of the vehicle frame.

With these and other objects in view, the invention consists of the novel construction and arrangement of parts that will be hereinafter described in connection with the accompanying drawings and particularly pointed out in the claims.

It is to be understood that in the drawings many of the parts are shown more or less conventionally, and that, in some instances, the proportion of parts is inexact in order to clearly disclose certain features.

In the drawings, only a part of the forward portion of the main frame of the automobile is shown, as the improvements are manifestly not limited to use with any particular style of frame or body.

In the drawings:

Fig. 2 is a plan with the main frame and upper part of the fifth wheel connection removed and the gear casing in section;

Fig. 3 is a transverse, vertical section substantially on the line 3—3 of Fig. 1;

Fig. 4 is a plan view illustrating particularly the steering devices;

Figs. 5 and 6 illustrate, in horizontal and transverse vertical section, a change speed transmission that may be employed.

Figure 1:
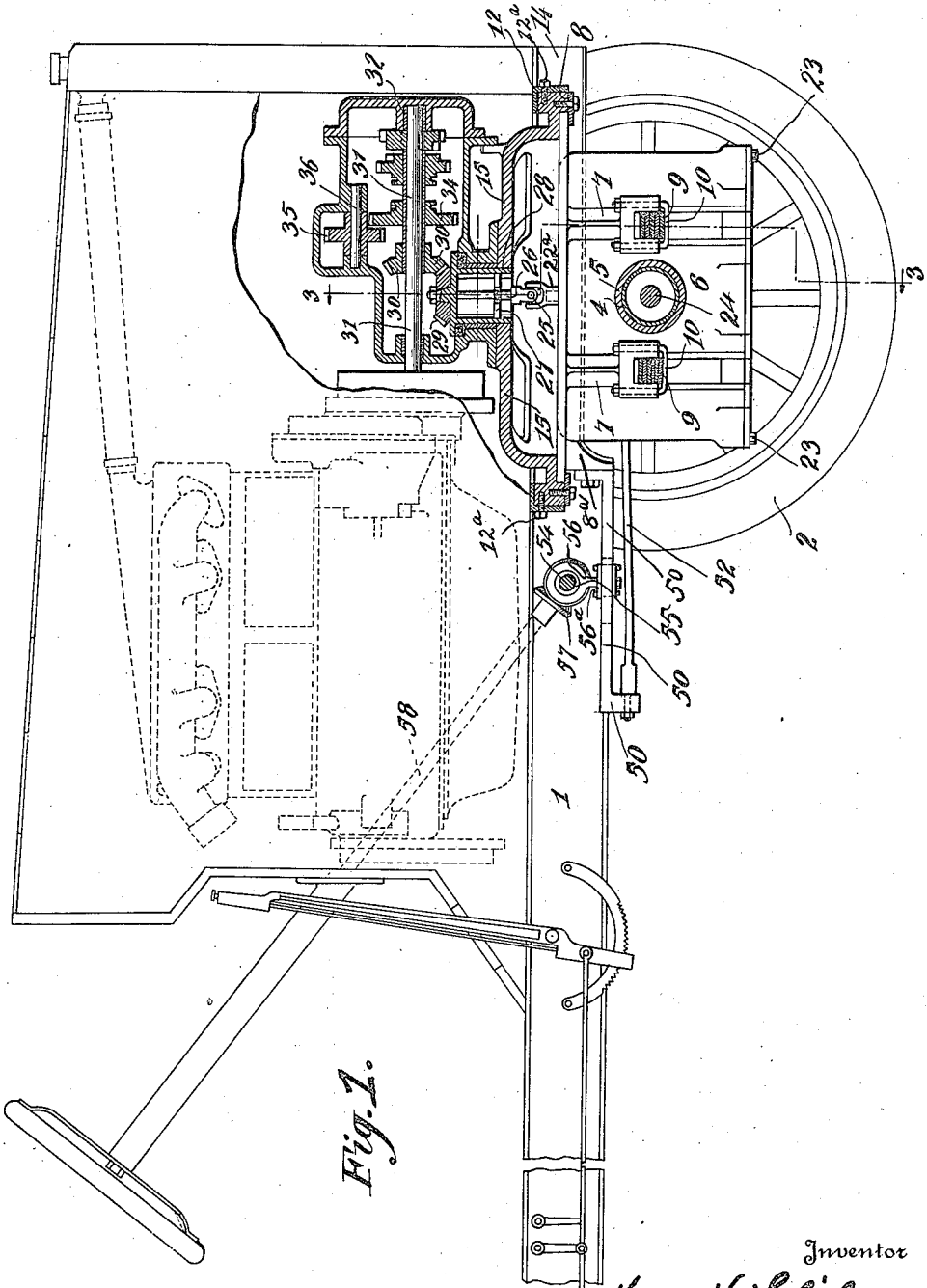
Fig. 1 is a view, partly in longitudinal section, of the forward portion of the main frame of an automobile, having an embodiment of the invention applied thereto.

Referring to the drawings the portion of the vehicle frame that is illustrated comprises longitudinal bars 1, of channel form in cross section which are connected by suitable transverse bars.

The front road wheels 2, are each supported by a section 4 of the tubular front axle, the inner adjacent ends of which are supported by bearings 5 extending laterally from opposite sides of a gear casing that will be hereinafter more particularly described.

In the outer face of each of the side walls of the gear casing 6 are formed two vertical grooves, situated respectively in front and in rear of the laterally projecting axle bearing 5; and into such grooves extend the inner edges of arms 7 that are formed integral with the lower ring 8 of a fifth wheel connection between said gear casing and the main frame 1.

At their lower ends the arms 7 have laterally extending brackets 8ª to which the inner ends of leaf springs 9 are connected. As shown the ends of the springs are drawn into close engagement with and firmly secured to the brackets 8 by clips 10 extending through the brackets and embracing the springs, suitable nuts being provided on the limbs of the clips above the brackets.

At their outer ends the springs 9 are connected to the outer ends of the axle sections 4, or the wheel hubs, by links 11.

The upper circle member 12 of the fifth wheel connection between the gear casing 6 and the frame 1 is rigidly secured to said frame. As shown this member is secured to cross bars 13, 14 and the side bars of the frame by bolts 12ª and is provided with a plurality of inwardly extending upwardly curved arms 15 that are connected by a centrally apertured hub member 16.

Any suitable, detachable, means may be provided for holding the two circle members 8, 12 of the steering devices or fifth wheel connection between the gear casing 6 and vehicle frame in proper contact. As shown a sectional ring is bolted to the lower face of the member 12 and extends inward beneath the member 8 (see Figs. 2 and 3).

The grooves in the outer faces of the sides of the gear casing 6 are longitudinally curved or slightly convex as shown by dotted lines in Fig. 3 so that there may be a relative rocking movement between the casing and the axle sections about an axis extending longitudinally of the vehicle.

Within the casing 6 are arranged the main elements of the driving mechanism for the wheels 2. This includes two sets of differential gearing respectively supported on horizontal shafts 20, 21 that are mounted in a frame 22 which is detachably supported within the casing 6. As shown the casing 6 is open at the bottom and the lower plate of the frame 22 is of such size that it extends across the bottom edges of the sides of the casing 6 and is secured thereto by screw bolts 23.

A vertical shaft 22ª is mounted in bearings in the top and bottom of the frame 22 and is provided with two oppositely threaded worms that respectively mesh with the worm wheels of the two differential mechanisms on the shafts 20 and 21. Each of said differentials is provided with pinions that mesh with gears on the inner ends of driving shafts, or, live axle members 24 that extend through the axle sections 4 and have their outer ends suitably connected to the wheels 2.

The vertical shaft 22ª is coaxial with the axis of the fifth wheel connection between the gear casing 6 and main frame so that the axle and road wheels 2 may be turned as desired in steering the vehicle without interference with any of the mechanism for propelling said wheels.

In case it is necessary or desirable to remove the driving mechanism it is only necessary to detach the hub caps of the wheels 2 and withdraw the shafts 24. Then by unscrewing the bolts 23 the frame 22 and all of the gearing supported thereby can be withdrawn from the casing 6.

The drive shaft 22ª extends above the top of the casing 6 and at its upper end is connected by a universal joint 25 to a short shaft 26 that is provided at its upper end with a plurality (preferably four) radiating arms 27 that extend into vertical slots or grooves formed in a cylindrical member 28 that is mounted in a bearing in the hub 16 of the fixed member of the fifth wheel connection previously described. Said member 28 is shown as provided with an expanded head that rests on a suitable antifriction bearing and to which head is secured a bevel gear 29 that meshes with a corresponding gear 30 on a sleeve surrounding a shaft 31 that is connected directly to and forms a continuation of the main crank shaft of an engine 31, conventionally illustrated in dotted lines in Fig. 1.

While it will be clear that any suitable and preferred type of motor or engine may be employed there is conventionally illustrated a four cylinder internal combustion explosive engine and also a variable speed transmission is shown interposed between the said motor and the driving gear 30.

As shown the gear 30 is supported at one end of a sleeve 32 that surrounds the shaft 31 which is mounted in bearings at opposite ends of a casing supported on the frame 1 and the stationary member of the fifth wheel connection between the frame and gear casing 6.

On the shaft 30, beyond the end of the sleeve 32 to which the gear 30 is secured, is mounted a gear 34 that meshes with a gear 35 on a counter shaft 36. The counter shaft is provided with three gears 37, 38, 39 of different diameters and gears 40, 41 slidable on the sleeve 32 are adapted to, respectively, be moved into and from meshing relation to said gears 37, 38 so that the speed of the sleeve and consequently the bevel gear 30 may be varied in the usual manner.

The gear 40 is also provided with a clutch member adapted to engage a similar member on the gear 34 so that, when desired, the sleeve 32 and gear 30 thereon may be directly connected to the shaft 31.

The gear 41 is slidable on the sleeve 32 so that it may mesh directly with the gear 38 on the countershaft or, through a reverse gear 42, with the gear 39 on the counter shaft. This last connection provides for driving the sleeve 32 and bevel gear 30 thereon in a reverse direction to that in which the shaft 31 turns.

In the embodiment of the invention illustrated the motor is arranged in rear of the axis of the vertical drive shaft 24 and the transmission in front of such axis, so that it is necessary, in order to provide the desired compact arrangement of parts, to mount the gears 30, 41 and 40 on a sleeve through which the shaft 31 that is directly connected to the motor shaft extends. It will be evident, however, that the motor and transmission may be both arranged at the same side of the axis of shaft 24 in which case a different specific arrangement of transmission may be employed. The means for moving the sliding gears 41, 40 are not illustrated in detail, as any well known form of means for this purpose may be employed.

For steering the vehicle, or turning the front axle and road wheels 2 about the vertical axis of the fifth wheel connection between such axle and the vehicle frame, it is preferred to employ the construction which is particularly illustrated in Figs. 1, 2 and 4. Referring to these figures it will be seen that the lower ring member 8 is provided with an interior flange that conforms closely to the outline of the gear casing 6 so that it does not interfere with vertical movement of said casing.

A portion of said flange is deflected downward, as at 8ª, and to said depending, arc shaped flange is secured a radially projecting arm 50 that extends rearwardly of the frame 1 and in which is formed a longitudinal slot 51.

The rear end of the arm 50 is bent downward and to such end is suitably connected a forked radius rod 52 the forward ends of the arms of which are connected to the hubs of the road wheels 2.

A shaft 53 mounted in bearings in the frame 1 extends transversely across the arm 50 and is provided with an intermediate threaded section 54 about which is fitted a nut or internally threaded sleeve 55. A stud or lug 56 extends downward from the nut 55 and passes through the slot 51, and on said stud is secured a block that is free to slide in said slot. To the upper and lower faces of said block are attached plates 56ª that extend laterally beyond the edges of the slot 51 and thus hold the block vertically on the arm 50.

On the shaft 53 is secured a bevel pinion 57ª with which meshes a similar pinion 57 at the lower end of a steering rod 58 suitably mounted on the vehicle frame. As the steering rod 58 is turned the shaft 53 will be rotated and the nut 55 moved transversely of the machine, such movement being communicated to the arm 50 and lower member 8 of the connection between the frame and front axle so that the latter and the road wheels will be turned about the axis of the vertical shaft 24.

Having thus described the invention what is claimed and desired to be secured by Letters Patent is:

1. In a motor-driven vehicle, the combination with a vehicle frame, of a divided axle carrying road wheels, a casing receiving the inner ends of the axle sections and connected with the vehicle frame to turn about a vertical axis, gearing in said casing for driving the road wheels and including a member rotatable about said vertical axis, and springs extending from the connection between said casing and the vehicle frame to the axle sections adjacent the road wheels.

2. In a motor-driven vehicle, the combination with a vehicle frame, of a divided axle carrying road wheels, a casing receiving the inner ends of the axle section and connected with the vehicle frame to turn about a vertical axis, gearing in said casing for driving the road wheels and including a member rotatable about said vertical axis, and two sets of springs arranged respectively in front and in rear of the axle between the connection of said casing with the vehicle frame, and the axle sections.

3. In a motor-driven vehicle, the combination with a vehicle frame, of a divided axle carrying road wheels, a casing receiving the inner ends of the axle sections and connected with the vehicle frame to turn about a vertical axis, gearing in said casing for driving the road wheels and including a member rotatable about said vertical axis, the connection between the casing and vehicle frame permitting independent longitudinal vibration of the axle sections relative to the frame, and springs between the connection of said casing to the vehicle frame and the axle sections.

4. In a motor-driven vehicle, the combination with a vehicle frame, of a divided axle carrying road wheels, a casing receiving the inner ends of the axle sections, a shaft extending from each road wheel through the connected axle section into said casing, gearing in said casing connecting said shafts and including a vertically arranged driving shaft, and means connecting said parts with the vehicle frame and permitting turning thereof about the axis of said driving shaft including a member connected to the vehicle frame and having spaced arms extending into grooves in the opposite sides of said casing, and springs connecting said arms with the axle.

5. In a motor-driven vehicle, the combination with a vehicle frame, of a divided axle carrying road wheels, a casing receiving the inner ends of the axle sections, a shaft extending from each road wheel through the connected axle section into said casing, gearing in said casing connecting said shafts and including a vertically arranged driving shaft, and means connecting said parts with the vehicle frame and permitting turning thereof about the axis of said driving shaft including a circular member suspended from the vehicle frame and provided with depending arms that extend into grooves formed in opposite walls of the gear casing, and springs having their inner ends connected to said suspended member and their outer ends attached to the axle adjacent the road wheels thereon.

6. In a motor-driven vehicle, the combination with a vehicle frame, of a divided axle carrying road wheels, a casing receiving the inner ends of the axle sections and connected to the frame by means permitting it to turn about a vertical axis, means for driving the road wheels including a member rotatable about the said vertical axis, the connection between the frame and said casing being provided on opposite sides of the casing with laterally projecting brackets, and springs having their ends connected to said brackets and to the adjacent axle section.

7. In a motor-driven vehicle, the combination with a vehicle frame, of a divided axle carrying road wheels, a casing receiving the inner ends of the axle sections, a shaft extending from each road wheel through the axle into said casing, gearing in the casing connecting said shafts and including a vertically arranged driving shaft, and a fifth wheel connection between the casing and vehicle frame permitting rotation of said casing and axle about the axis of said driving shaft and including a member depending from the frame and engaging the casing, the contacting surfaces between said member and casing being slightly curved in the direction of the height of the casing, for the purpose described.

8. In a motor-driven vehicle, the combination of a vehicle frame, a divided front axle each section carrying a road wheel, connections between the frame and forward axle permitting the latter to turn about a vertical axis, means for driving the road wheels on the front axle including a shaft rotatable about said vertical axis, a motor supported on the frame adjacent the forward end thereof, and connections between the motor and said shaft including a variable speed mechanism on the frame in advance of the motor and the vertical plane of the front axle.

9. In a motor-driven vehicle, the combination with a vehicle frame, of a divided axle carrying road wheels, a casing connecting the inner ends of the axle sections, a fifth wheel connection between the casing and vehicle frame, a shaft extending from each road wheel through the connected axle section into said casing, and gearing in the casing connecting said shafts and including a vertically arranged driving shaft, said gearing and driving shaft being bodily removable from the casing.

10. In a motor-driven vehicle, the combination with a vehicle frame, of a divided axle carrying road wheels, a casing connecting the inner ends of the axle sections and having a bottom detachably connected with the body thereof, and differential gearing supported within the casing by said removable bottom and adapted to connect said shafts, such gearing being bodily removable from the casing with the detachable bottom.

11. In a motor-driven vehicle, the combination with a vehicle frame, of a divided axle carrying road wheels, a casing connecting the inner ends of the axle sections and having a detachable bottom, a fifth wheel connection between the frame and casing, a shaft extending from each road wheel through the connected axle section into said casing, and gearing within the casing adapted to connect said shafts and including a driving shaft arranged coaxial with said fifth wheel connection, said gearing and driving shaft being bodily removable from the casing when the bottom thereof is detached and the road wheel shafts disconnected.

12. In a motor-driven vehicle, the combination with a vehicle frame, of a divided axle carrying road wheels, a casing connecting the inner ends of the axle sections, a fifth wheel connection between the frame and casing comprising a relatively stationary member on the frame, and a member supported by springs attached to the axle sections and engaging the casing, a shaft extending from each road wheel through the connected axle section into the casing, and gearing supported within the casing, adapted to connect said shafts, and including a vertical driving shaft, said gearing being bodily removable from the casing with the vertical driving shaft when the road wheel shafts are disconnected from such gearing.

13. In a motor-driven vehicle, the combination with a vehicle frame, of a divided axle carrying road wheels, a casing connecting the inner ends of the axle sections and having vertical grooves in the outer faces of opposite side walls, a fifth wheel connection between the frame and casing comprising a relatively stationary member on the frame and a member having ribs engaging the grooves in the casing, leaf springs connecting the last said member with and supporting it from the sections of the axle, a shaft extending from each road wheel through the connected axle section into the casing, and gearing supported within the casing, and connecting said road wheel shafts.

14. In a motor-driven vehicle, the combination with a vehicle frame, of an axle carrying road wheels, means connecting the axle with the vehicle frame and permitting it to turn about a vertical axis including a circular member mounted on the frame and provided with a radially projecting arm, having a longitudinally extending slot formed therein, rods connecting said arm with the axle adjacent each road wheel, means for driving the road wheels including a shaft rotatable about said vertical axis, a screw mounted on the frame, a nut engaging the screw and having a stud that extends into said slot, and means for rotating the screw.

In testimony whereof I have hereunto set my hand.

HARRY H. SCHIELER.